United States Patent
Cahill et al.

(12)

(10) Patent No.: US 6,506,463 B1
(45) Date of Patent: Jan. 14, 2003

(54) COPOLYAMIDE ACTIVE-PASSIVE OXYGEN BARRIER RESINS

(75) Inventors: Paul J. Cahill, Wheaton, IL (US); Joel Albert Richardson, Naperville, IL (US); Raymond V. Wass, Glen Ellyn, IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/485,475

(22) PCT Filed: Feb. 17, 1998

(86) PCT No.: PCT/US98/02991

§ 371 (c)(1),
(2), (4) Date: Feb. 11, 2000

(87) PCT Pub. No.: WO99/15432

PCT Pub. Date: Apr. 1, 1999

Related U.S. Application Data (63) Continuation-in-part of application No. PCT/US97/16711, filed on Sep. 22, 1997, and a continuation-in-part of application No. 08/717,370, filed on Sep. 23, 1996, now Pat. No. 6,083,585.

(51) Int. Cl.[7] .............................................. B29D 22/00
(52) U.S. Cl. ..................................................... 428/35.7
(58) Field of Search ........................................ 428/35.7

(56) References Cited

U.S. PATENT DOCUMENTS

| | | | | |
|---|---|---|---|---|
| 4,555,566 A | * | 11/1985 | Arita | 528/323 |
| 5,021,515 A | | 6/1991 | Cochran et al. | 525/371 |
| 5,792,812 A | * | 8/1998 | Fujiki | 525/106 |
| 6,013,373 A | * | 1/2000 | Kuder | 428/411.1 |

* cited by examiner

*Primary Examiner*—Paul R. Michl
(74) *Attorney, Agent, or Firm*—Joseph DiSalvo (57) ABSTRACT

Compositions for scavenging oxygen are disclosed. These compositions comprise copolyamides comprising over 50 weight percent polyamide segments and an active oxygen scavenging amount of polyolefin oligomer segments. The polyamide segments comprise segments derived from typical bottling and packaging polyamides such as polyhexamethyleneadipamide and polyphthalamides. The copolymers are preferably formed by transesterification during reactive extrusion and typically comprise about 0.5 to about 12 wt. % of polyolefin oligomer segments. The copolyamides provide enhanced active and passive oxygen barrier properties over similar polyester constructions and similar polyamide constructions, when used in a laminar construction. In a series of preferred embodiments, multi-layered bottles fabricated with the oxygen scavenging copolyatnides of this invention are about 99.8 wt. % polyamide and suitable for recycle with other polyamide bottles.

11 Claims, 2 Drawing Sheets

COPOLYAMIDE ACTIVE-PASSIVE OXYGEN BARRIER RESINS

RELATIONSHIP TO OTHER APPLICATIONS

This application is a continuation in part of an earlier U.S. patent application No. 08/717,370, filed on Sep. 23, 1996, now U.S. Pat. No. 6,083,585. It is also a continuation in part of PCT application filed on Sep. 22, 1997 having Application Ser. No. PCT/US97/16711.

STATEMENT REGARDING FEDERALLY FUNDED RESEARCH (Not Applicable)

FIELD OF THE INVENTION

The invention generally relates to compositions, articles, and methods for packaging oxygen-sensitive substances, especially comestible products. The invention is directed to oxygen barrier materials having improved passive oxygen barrier properties and also having active oxygen scavenger properties. The active oxygen scavengers of this invention are condensation copolymeric substances which can be used for bottles and packaging and have the ability to consume, deplete or reduce the amount of oxygen in or from a given environment in the solid state at ambient temperatures. Formulations are disclosed which may be fabricated into plastic bottles and other packaging articles and films.

BACKGROUND OF THE INVENTION

Plastic materials have continued to make significant advancements into the packaging industry due to the design flexibility of their material and their ability to be fabricated in various sizes and shapes commonly used in the packaging industry. The deployment of plastic materials into packaging articles such as films, trays, bottles, cups, bowls, coatings and liners is already commonplace in the packaging industry. Although plastic materials offer the packaging industry many benefits with an unlimited degree of design flexibility, the utility of plastic materials has remained inhibited in situations where barrier properties to atmospheric gases (primarily oxygen) are necessary to assure adequate product shelf life. When compared to traditional packaging materials such as glass and steel, plastics offer inferior barrier properties which limits their acceptability for use in packaging items that are sensitive to atmospheric gases, particularly when the exposure to the atmospheric gases will entail extended time periods. The packaging industry continues to seek packaging materials which offer the design flexibility of plastics and at the same time have the barrier properties of glass and steel.

The packaging industry has developed technology to improve the barrier properties of plastic containers by developing containers that offer improved barrier properties approaching, but not comparable to, those of glass, steel, and aluminum. By a very wide margin, polyethylene terephthalate (PET) and similar packaging polyesters have gained wide acceptance, especially for bottling applications, in view of the clarity and rigidity associated with PET bottles. PET has made significant inroads into bottling and packaging applications at the expense of the use of glass containers but primarily in applications where the needs for barrier properties are modest. A significant example is the use of PET for soft drink bottles. However, PET barrier properties have limited its use in the packaging of oxygen sensitive products.

It is generally accepted in the packaging industry that polyamides have superior passive oxygen barrier properties when compared to similar polyester packaging constructions. A useful passive oxygen barrier polymer is one that exhibits the ability to retard the permeability of oxygen through it when compared with the permeability of oxygen through other resins. Further, it has been reported that a polyamide known as MXD-6 has some active oxygen barrier capacity. MXD6 is poly(m-xyleneadipamide) which is a polyamide made from equal molar amounts of the two monomers (1) meta-xylenediamine and (2) adipic acid. An active oxygen barrier resin is a substance capable of intercepting and scavenging oxygen (by undergoing chemical reaction with the oxygen) as it attempts to pass through the packaging. This method also affords the opportunity to eliminate unwanted oxygen from within the package cavity wherein said oxygen may have been inadvertently introduced during packaging or filling. This method of providing oxygen barrier properties where a substance consumes or reacts with the oxygen is known as an "active oxygen barrier" and is a different concept from passive oxygen barriers which attempt to hermetically seal a product away from oxygen via the passive approach.

When MXD-6 (about 4 wt %) is blended with PET (about 96 wt %), the resulting blend is about 70% as permeable to oxygen as a similar construction of unmodified PET. Presumably, this 30% improvement over unmodified PET may be attributed to the improvement in passive barrier properties of the aforementioned blend. When an oxidation catalyst is added to the blend (e.g., about 50–200 PPM cobalt with respect to the weight of the blend), the blend takes on enhanced active oxygen scavenging properties. The $O_2$ permeability of the blend is diminished under these conditions until the active $O_2$ scavenging capacity of the blend is depleted. The barrier properties achieved by the blend are suitable only for less demanding packaging requirements and then only with very heavy use of the blend. However, MXD-6 is a relatively expensive polyamide and the use of large amounts of it in a package serves to undermine the economic viability of such packaging. Lower cost, more common polyamides, such as the well known poly(hexamethyleneadipamide) have the improved passive barrier properties of polyamides but are devoid of active barrier properties. What is needed is an active-passive polyamide oxygen barrier polyamide-based resin which may be produced at reasonable cost and which has sufficient oxygen scavenging and barrier properties to offer the possibility of target shelf lives in the range of 6 months to two years for oxygen sensitive products. This invention addresses such need.

INVENTION SUMMARY AND REVIEW OF PRIOR ART

In a commonly assigned and co-pending application filed on Sep. 23, 1996 and having Ser. No. 08/717,370, it was disclosed that certain hydrocarbons, such as polyolefins, (especially polydienes) when present in small amounts as polyolefin oligomer blocks in a block copolyester polymer added substantial active oxygen scavenging capacity to packaging polyesters which showed no active oxygen scavenging capacity what-so-ever in the absence of the polyolefin oligomer blocks. The oxygen scavenging copolyesters of the above-referenced application were comprised predominantly of packaging polyester segments with only an oxygen scavenging amount of polyolefin oligomer segments present to supply the oxygen scavenging capacity required for the intended packaging application. The copolyesters of the application having Ser. No. 08/717,370 were typically in the range of about 0.5–12 wt % polyolefin oligomer segments with the remainder comprising polyester segments. An especially preferred embodiment was a copolyester of about 4 wt % polyolefin oligomer segments with the remainder being polyester segments. Such block copolyesters comprising low weight percent levels of polyolefin oligomer segments have properties (such as melting point, viscosity, and clarity) very similar to the unmodified polyester from which the polyester segments were derived. In particular, layers in laminar packages and bottles having one or several layers of unmodified polyester and one or several layers of oxygen scavenging block copolyester as described above, were self-adherent and packaging articles appeared to be a monolithic (rather than layered) construction.

For this invention, applicants have extended the concept of implanting high capacity oxygen scavenging polyolefin oligomer segments into polyamides forming block copolyamides comprising predominantly polyamide segments and an oxygen scavenging amount of polyolefin oligomer segments. As was the case for the copolyesters disclosed in the application having Ser. No. 08/717,370, the copolyamides of this invention have properties very similar to the polyamide from which the polyamide segments were derived. A typical use for such polyamides comprises a layered construction such as a package film or bottle wall having outer and inner layers of polyamide and a middle layer of copolyamide (wherein the polyamide segments of the copolyamide are derived from those of the inner and/or outer layer polyamides and the oxygen scavenging segments comprise a polyolefin oligomer). This arrangement serves to provide properties for the copolyamide layer which are very similar to the properties of the unmodified polyamide layers which is an important concept of this invention for laminar constructions. A major concept of this invention, however, is the incorporation of highly efficient oxygen scavenging polyolefin oligomer segments into the copolyamide while leaving the copolyamide with properties very similar to the unmodified polyamide. The high active oxygen scavenging capacity of the copolyamides disclosed is derived from the active oxygen scavenging capacity of the polyolefin oligomer segments. As noted previously, polyamides, per se, are generally considered to have superior passive oxygen barriers properties as compared to polyesters. Thus, another important concept of this invention is the combination of superior passive barrier properties with active oxygen scavenging capacity when compared to the use of unmodified polyester alone or unmodified polyamide alone.

An active oxygen barrier resin is a substance capable of intercepting and scavenging oxygen (by undergoing chemical reaction with the oxygen) as it attempts to pass through the packaging. Active oxygen scavenging also affords the opportunity to eliminate unwanted oxygen (often called head space oxygen) from within the package cavity wherein said oxygen may have been inadvertently introduced during packaging or filling. This method of providing oxygen barrier properties where a substance consumes or reacts with the oxygen is known as an "active oxygen barrier" and is a different concept from passive oxygen barriers which attempt to physically seal a product away from oxygen via the passive approach. Only active oxygen scavengers can remove unwanted oxygen (inadvertently introduced during packaging) from the package cavity. Active oxygen scavenging implies, therefore, consumption of a material incorporated in the wall of a package. The material is progressively consumed so that the active oxygen scavenging ability is eventually depleted or at least diminished. However, this eventual depletion of the active oxygen scavenging moiety can be adjusted so that the depletion occurs only well after the required oxygen free shelf life of the packaged product which is typically one year or less.

U.S. Pat. No. 5,021,515 (CMB Patent) discloses CMB's OxBar oxygen scavenging system. The CMB Patent is directed to the use of a polyamide (blended with polyester) as an active oxygen scavenger moiety. The CMB Patent discloses the use of a polyamide blended with a bottling polyester such as PET and further requires the presence of a catalyst, such as a transition metal. Such blends are subsequently deployed so as to comprise at least one layer in a single or multi-layer package or bottle wall. According to the CMB Patent, the polyamide in the blend is the moiety responsible for the active oxygen scavenging capacity. of the blend. In a preferred embodiment of the CMB Patent, 96 wt % PET is blended with 4 wt % of a polyamide frequently designated as MXD6. MXD6 is a polyamide made from equal molar amounts of the two monomers (1) metaxylene diamine and (2) adipic acid. The PET/MXD6 blend is typically deployed in the presence of about 200 PPM of cobalt which serves to catalyze the active oxygen scavenging function.

EP-A-0 507 207 discloses a composition for scavenging oxygen comprising an ethylenically unsaturated hydrocarbon polymer and a transition metal catalyst.

The current invention is directed to the use of copolyamides capable of scavenging oxygen in the solid state comprising predominately polyamide segments and an oxygen scavenging amount of polyolefin oligomer segments. The copolyamides of this invention are typically deployed in the presence of a catalyst, such as a transition metal, and comprise at least one layer of a single or multi-layer wall of a package or bottle. Significant differences between this invention and the CMB Patent include (1) the current invention is directed to a copolyamide comprising predominantly polyamide segments while the CMB Patent discloses a polyester/polyamide blend which is predominantly polyester (the CMB Patent does not disclose the use of polyolefin what-so-ever), (2) the polyolefin oligomer segments in the copolyamides of this invention are the moieties which react with and scavenge the oxygen whereas in the CMB Patent the polyamide reacts with and scavenges the oxygen, (3) the oxygen scavenging ability of the copolyamides of this invention are substantially greater than those of the PET/MXD6 blend, and (4) the copolyamides of this invention are typically used in polyamide based packages and bottles where as the PET/MXD-6 blend is aimed at polyester (PET) based packages and bottles.

DETAILED DESCRIPTION OF THE PREFERRED EMBODIMENTS

As previously noted, polyamides, in general, have superior passive oxygen barrier properties compared to similar polyester packaging constructions. This is true for the less expensive and well known polyamides such as poly (hexamethyleneadipamide) as well as for the more exotic and rather expensive polyamides such as MXD6. The polyamides used for fabrication of plastic bottles and other packaging articles can be the same polyamides from which the polyamide segments are derived in the oxygen scavenging copolyamides disclosed in this invention. It is well known in the polyamide art to prepare polyamides by polymerizing together (typically on an equal molar basis and in the presence of suitable catalyst) two separate chemical substance monomers as depicted in Formula I and Formula II to form the repeating polyamide unit depicted in Formula III.

R1 in the dicarboxylic acid monomer of Formula I is any substituted or unsubstituted organic divalent radical and may be aromatic, aliphatic, alicyclic, or mixtures thereof. R2 in the diamine monomer of Formula II is any substituted or unsubstituted organic divalent radical and may be aromatic, aliphatic, alicyclic, or mixtures thereof. In certain instances, R1 and R2 (both, individually, and/or independently) may contain olefinic unsaturation. Such unsaturated species, if present, are envisioned to be within the scope of the present invention. Further, those skilled in the art will recognize that other forms of the species represented in Formulas I and II may be used and will still lead to essentially the same polyamide as depicted by Formula III. For example, the mono or diacid halide derivatives or the mono or diester derivatives of the diacid of Formula I would yield (after polymerization) essentially the same polyamide shown in Formula III. Similarly, substitution for some or all of the four hydrogens shown in the diamine species of Formula II would yield (after polymerization) essentially the same polyamide shown in Formula III.

In somewhat greater detail, the preferred polyamide resins suitable for use in the present invention include linear polyamides such as those wherein the Formula I dicarboxylic acid component is selected from a list which includes aliphatic diacids such as adipic acid, phthalic acid, isophthalic acid, terephthalic acid, the various naphthalene dicarboxylic acids, and mixtures of the preceding list. Preferred Formula II diamines include polyalkylene diamines such as hexamethylene diamine, aromatic diamines such as the xylene diamines, and mixtures of the preceding.

Polyamides prepared from the above components are well known in the art, and can be prepared via polymerization reacting the dicarboxylic acid (or suitable derivatives) of Formula I and the diamine (or suitable derivatives) of Formula II. In many cases, polyamides suitable for use in this invention are available for purchase from a variety of suppliers such as the Amodel® series of polyamides available from Amoco Chemical Company and the Zytel® series of polyamides available from Du Pont. In selected embodiments, the present invention also contemplates the use of recycle polyamides as part or all of the polyamide feed.

Other suitable polyamides for use in the present invention include branched polyamides These branched species could be prepared using mainly difunctional carboxylic acid type monomers together with some carboxylic acid monomers having a functionality greater than two and then polymerizing these acids with polyamines. Alternatively, branched species could be prepared using mainly diamine monomers together with some polyamines having more than two amine groups and then polymerizing these polyamines with multifunctionality acid monomers. Examples of acids having functionality greater than two include trimellitic acid, and pyromellitic acid (or their anhydrides).

When monomers of Formula I and monomers of Formula II react to give the repeating structure of Formula III, this type of polymerization is known as polycondensation or condensation polymerization. In the book "GLOSSARY OF CHEMICAL TERMS" by C. A. Hampel and G. G. Hawley, Von Nostrand, 1976, a definition for condensation polymerization is offered on Page 67. According to this reference, a condensation polymer is a linear or three dimensional macromolecule made by the reaction of two organic molecules usually with the formation of water or alcohol as a by-product. The reaction is repetitive or multi-step as the macromolecule forms. These repetitive steps are known as polycondensation. Among the examples given as condensation polymers are polyesters and polyamides. In 1929 Carothers (W. H. Carothers, J. Am. Chem. Soc. 51,2548 (1929)) proposed a generally useful differentiation between two broad classes of polymers. One of the Carothers' classes was condensation polymers in which the molecular formula of the structural (repeating) unit or units in the polymer lack certain atoms present in the monomer or monomers from which it was formed, or to which it may be degraded by chemical means. Carothers other class was addition polymers in which the molecular formula of the structural (repeating) unit or units in the polymer is identical with that of the monomer from which the polymer is derived. The polymers and copolymers of importance in this invention are those which Carothers would have considered to be condensation polymers in view of their polymerization characteristics and the formulas of the repeating units in the polymers versus those of the forming monomers. In one aspect of this invention, novel condensation copolymers are disclosed comprising predominantly polyamide segments and oxygen scavenging hydrocarbon segments in the amount effective to provide the required oxygen scavenging capacity. As will be explained in further detail later, these hydrocarbon segments of the condensation copolymer are in actuality oligomers of an addition polymer.

Of course it was necessary for applicants to focus on evaluation and selection of appropriate hydrocarbon segments which could be incorporated into a copolyamide and afford the necessary oxygen scavenging capacity while not detrimentally affecting the salient features and properties of the packaging polyamides and segments derived therefrom for the copolymer. Applicants recognized and established that hydrocarbons such as polyolefins (especially polydienes) afforded good oxygen scavenging capacity when added as blocks in a copolyester. As will be verified in the examples section of this specification, further analysis and experimentation confirmed that polyolefin segments in copolyamides would add active oxygen scavenging capacity to polyamides in a manner similar to that which was observed for copolyesters having polyolefin oligomer blocks. Generally the oxygen scavenging capacities of the polyamides were best when low molecular weight polyolefin oligomers were used typically having molecular weights in the range of 100–10,000. Especially preferred are polyolefin oligomers having molecular weights in the range of 1000–3000. The preferred polyolefin oligomers for use as hydrocarbon segments in the oxygen scavenging copolyamides are polypropylene, poly(4-methyl)1-pentene and polybutadiene. While it is not a hydrocarbon material as such, polypropylene oxide glycol oligomer also was also identified as a potentially useful oxygen scavenging substance. Of these, polybutadiene oligomer is especially preferred since it has a high oxygen scavenging propensity and also because it is commercially available in the form necessary for making the oxygen scavenging copolyamides of this invention by the preferred method of this invention.

As previously stated, the polyolefin oligomer segments need to be present in the copolyamides of this invention only to the extent necessary to afford the desired oxygen scavenging capacity. One reason for keeping the polyolefin oligomer segments at only the level required is to satisfy the objective of keeping the copolyamide as similar as possible to the polyamide homopolymer. In practice, it has been found that the presence of polyolefin oligomer segments in the range of 0.5 wt % to 12 wt % based on weight of the copolyamide is a typical wt % usage range. Preferred is the presence of polyolefin oligomer segments in the range of about 2 wt % to about 8 wt % based on weight of the copolyamide. Especially preferred is the presence of polyolefin oligomer segments in the range of about 2 wt % to about 6 wt % based on weight of the copolyamide.

The copolyamides of this invention have the ability to absorb oxygen in the glassy solid state at ambient temperatures of 0° C. to about 60° C. This functional range for the copolyamides is below the glass transition temperature ($T_g$) of these compositions. This behavior is in marked contrast to prior art oxygen scavengers which absorb oxygen at room temperature (or even colder) but still above the $T_g$. It is well understood that gas permeability is greatly increased above the $T_g$ when the material is no longer a solid and therefore serves to nullify the scavenging utility of such scavengers. Another major advantage of the copolymers of this invention, particularly as compared to oxidizable metal/electrolyte formulations, is that they will scavenge oxygen in the absence of water or moisture (as well as in the presence of moisture or water). This permits use of the oxygen scavenger copolymers of this invention for packaging dry materials such as electronic components, dry snack foods, medical items. This ability to scavenge oxygen in a dry environment further distinguishes the oxygen scavenger copolymers of this invention over many prior art scavengers which require the presence of water or at least a moist environment.

Generally the preparation of the oxygen scavenging copolyamides disclosed above will involve a step which comprises adding functionality to at least one or more (preferably more) of the terminal sites available in the scavenging polyolefin oligomer which is to be incorporated as segments in the copolyamides. The terminal functionality added must be a moiety capable of entering into polycondensation reactions and forming polycondensation linkages when incorporated into a polymer. It will be understood that there may be more than two end sites available for functionalization when there is crosslinking or branching in the polyolefin oligomer. In instances where di or multiple functionality is contemplated, generally it will be multiples of the same functionality, i.e., all hydroxy, all carboxy, or all amino added at plural end sites of the polyolefin oligomer molecule. Those of ordinary skill in the art will recognize that this invention can be practiced even when different, but chemically compatible, terminal functional groups are present on plural end sites of the polyolefin oligomer molecules. As noted previously, the only requirement is that the terminal functionality groups must be capable of entering into polycondensation reactions. A non-exhaustive list of terminal functional groups includes hydroxy, carboxylic acid, carboxylic acid anhydrides, alcohol, alkoxy, phenoxy, amine, and epoxy. The preferred terminal functional groups are hydroxy, carboxylic acid, and amino. It will be obvious that this step in the preparation can be avoided by using polyolefin oligomers which are already appropriately terminally functionalized and commercially available as such. In this regard, hydroxy terminal functional groups are especially preferred by applicants since hydroxy terminated polyolefin oligomers suitable for incorporation into the oxygen scavenging copolyamides of this invention are commercially available and offer attractive properties. Further understanding of the process may be gained by considering the chemical species depicted by Formulas IV, V, and VI.

IV.

In Formulas IV, V, and VI, (POO) represents a divalent polyolefin oligomer moiety. Although Formulas IV, V, and VI show difunctionality, the (POO) may be only singly functionalized or may be functionalized to a degree greater than two when crosslinking or branching of the (POO) offers more than two terminal functionalization sites. In Formula IV, the (POO) is dicarboxy terminated. In Formula V, the (POO) is dihydroxy terminated, and in Formula VI, the (POO) is diamino terminated. While Formulas IV, V and VI show the hydrogen forms for these species, it will be understood by those of ordinary skill in the art that from one to all of the hydrogens in each of Formulas IV, V and VI could be replaced by an organic radical such as alkyl, cycloalkyl, phenyl and still serve the same purpose in preparation of the oxygen scavenging copolyamides of this invention. Using the substituted forms of the species of Formulas IV, V and VI would simply produce different byproducts in formation of the copolymers. As noted above, this invention could be practiced with only one functional group per (POO) or with more than two functional groups per (POO). In Formulas IV, V and VI, difunctionality is shown but represents one of many levels of possible functionality. The method of formation of these functionally terminated species is unimportant to the disclosure of this invention. Commercially available forms of the Formula V (which is especially preferred) include Elf Attochem products R20LM and R45HT αω-polybutadienediols.

The similarity in chemical structure of the species represented in Formulas I and IV is easily discerned. Since polycondensation occurs by reaction of the terminal groups, copolycondensates can be formed comprising predominantly polyamide segments with some polyolefin oligomer segments. For easier understanding of the composition, it may be useful to think in terms of substitution of the desired amount of the species of Formula IV for an equivalent amount (based on moles) of the species of Formula I yielding copolycondensates having both polyamide and polyolefin oligomer segments. As noted previously, the copolymers are true copolycondensates with the unusual feature that some of the segments consist of addition polymer (actually oligomer). In the same way, the similarity of the species of Formula II and Formula VI is easily seen. Copolycondensates may be formed by substitution of the desired amount of the species of Formula VI for a molar equivalent amount of the species of Formula II. The nature of the polycondensation reaction forming the copolycondensates for these two types of segment substitutions would be similar to that found for formation of the true or unmodified polyamide. It would be expected that the by-products formed are similar also. The species of Formula V are dihydroxy terminated. A desired amount of these species may be substituted for an equivalent amount of the species of Formula II to produce a slightly different type of copolymer. When prepared in this manner, a condensation copolymer is formed where the linkages in the vicinity of tune polyolefin oligomer segments are polyester linkages. As will be shown later, these represent only a very small percentage, for example, of non-polyamide linkages and copolycondensates produced having some polyester linkages are suitable for purposes hereof just as are copolycondensates of this invention prepared with 100% polyamide linkages between the segments. The significant matter is that the polyolefin oligomer with oxygen scavenging capacity has been implanted into the copolycondensate as segments thus providing oxygen scavenging capacity to the product formed while retaining virtually all of the salient features of the original packaging/bottling polyamide. These techniques for introduction of desired polyolefin oligomer into the polycondensate when used at the low levels disclosed by the applicants provide a very precise and effective means for the dispersion of oxygen scavenging moiety throughout the copolycondensates. Attainment of a uniform dispersion of oxygen scavenging moiety in the copolycondensate while keeping the properties of the precursor polyamide is a key feature of this invention which further distinguishes the oxygen scavenging copolycondensates of this invention over the prior art. Attempting to produce oxygen scavenging materials by making a physical blend of unfunctionalized polyolefin oligomer and polyamide generally produces a non-rigid emulsion which is not useful for packaging. However, when the functionally terminated polyolefin oligomers are mixed or blended with polyamide at temperatures in excess of 200° C. in order to melt the polyamide, the copolycondensates of this invention will form, at least to some extent, by transesterification. Therefore blends and mixtures of functionally terminated polyolefin oligomers with polyamide, even if designated as such, may be within the scope of this invention as the blending and mixing processes at polyamide melt temperatures produce the copolycondensate compositions of this invention.

The preferred polyolefin oligomer starting material is the dihydroxy terminated (POO) species having a molecular weight in the range of about 100–10,000. The especially preferred polyolefin oligomer starting material is the dihydroxy terminated polybutadiene (PBD) species having a molecular weight in the range of about 1,000–3,000. Copolymers formed using PBD within the preferred molecular weight range will generally have a single $T_g$ (as measured by Differential Scanning Calorimetry) of about 100–130° C. and offer the ability to absorb oxygen at temperatures below the $T_g$. While the single $T_g$ copolymers are preferred, it will be understood by those of ordinary skill in the art that multiple $T_g$ copolymers are also applicable as long as the lowest glass transition temperature is a temperature above the packaging use temperature. The benefit of having a $T_g$ above the packaging use temperature is to afford container design flexibility associated with container rigidity. It is well understood that container rigidity can also be controlled by wall thickness allowing for flexible films to be produced by downgauging with said copolymers.

One objective of this invention is to produce copolyamides having predominantly polyamide segments and an oxygen scavenging amount of polyolefin oligomer segments which are capable of absorbing oxygen at ambient temperatures below their glass transition temperatures. This means that the copolymers scavenge oxygen as a solid. It is this feature which distinguishes the copolymers of this invention from many prior art oxygen scavengers which are employed as scavengers above their glass transition temperatures, i.e., not as solids. Those skilled in the art will recognize the many advantage of scavengers which are solids, including the ability to have a film or container which may be made entirely of the copolymer and still retain its form at ambient temperatures. For this invention, ambient temperatures means typical storage temperatures in the range of about 0° C. to about 30° C. In order to tolerate hot fill applications, the ambient temperature range would be from about 0° C. to about 60° C. The copolymers of this invention exist as solids even over the extended ambient temperature range from about 0° C. to about 60° C.

The copolymers of this invention may be produced using any form of polycondensation processes including direct continuous and/or batch reaction methods commonly used in making polyamides. The only deviation in the process is that instead of using, for example 50 mole % of a Formula I species and 50 mole % of a Formula II species, some of at least one of the species of Formulas IV, V, or VI is included and a corresponding molar amount of Formulas I or II species is withheld from the polymerization process. Alternatively, the copolycondensates can be prepared by taking a polyamide and polymerizing it further with the functionally terminated polyolefin oligomer by heating the components to obtain melt homogenization in an extruder. The extruder heating may be accomplished under vacuum or non-vacuum conditions. Those of ordinary skill in the art will recognize this form of processing as reactive extrusion. In such reactive extrusion processes, polycondensation occurs and the product is, in part or in whole, a copolymer comprising segments of the starting polyamide and segments of the polyolefin oligomer rather than a simple melt blend of the individual starting components. Reactive extrusion as described above, is the preferred method of making the copolycondensates of this invention.

In direct polycondensation processes, substitution of the desired amount of the functionally-terminated polyolefin oligomer for approximately an equivalent amount of one of the unmodified condensation polymer monomers results in high molecular weight copolymer. In this case, the desired amount of functionally-terminated polyolefin oligomer can replace equivalent molar amounts of one of the polyamide monomers. In the case of direct polycondensation, the amount of functionally terminated polyolefin oligomer that absorbs oxygen can be varied widely as long as the resulting copolymer exhibits the desired end state properties such as scavenging capacity and clarity required for the intended end use. Generally, when prepared in advance of incorporation into packaging articles, it is necessary to maintain the copolycondensates in an inert environment during storage. In most instances, the oxygen scavenging ability of the copolycondensates is present as soon as they are formed and an oxygen exposure induction period has elapsed. The potential for scavenging oxygen may be significantly diminished if left exposed to oxygen (or air) for lengthy periods. Furthermore, lengthy exposure to high temperature in the presence of oxygen can further reduce the oxygen absorption capacity of the copolymers when made into a packaging article and introduce the possibility of thermal decomposition and degradation if overly excessive. Premature loss of oxygen scavenging capacity prior to conversion of the copolymers into a packaging article can be controlled by storing in an inert environment or by addition of suitable stabilizing agents.

While the copolycondensates of this invention may be made by any suitable process, the preferred method of making the copolycondensates of this invention is by reactive extrusion as briefly described above and in more detail below and also again in the examples section of this specification. As part of the reaction extrusion process either alone or in combination with the fabrication step, the starting polyamide in the extruder is maintained under an inert atmosphere, preferably that provided by a nitrogen blanket. The functionally-terminated polyolefin oligomer is separately conveyed to the extruder and introduced into the extruder mixing zone. The rate of introduction of polyamide into the extruder is adjusted so as to allow sufficient residence time to melt the polyamide and cause it to react with the functionally terminated polyolefin oligomer to produce copolymer by transesterification. The preferred residence time is from about 3 to about 5 minutes at the preferred temperature range of about 260–3000° C. The functionally terminated polyolefin oligomer is introduced through a separate port on the extruder and the rate of introduction of the polyolefin oligomer is adjusted to provide the amount of polyolefin oligomer segments necessary to achieve the desired oxygen scavenging capacity in the copolycondensates. A typical range for polyolefin oligomer segments is from about 0.5 wt % to about 12 wt % of the total weight of product copolycondensate. A catalyst (transesterification/transamidation) which helps achieve the transformation, such as a transition metal carboxylate, may also optionally be employed in the extruder in a range of about 10–300 PPM of the mixture in the extruder. Cobalt carboxylates are the preferred transesterification catalysts and especially preferred is cobalt octoate since it causes the reaction to proceed quickly and it is available commercially at reasonable cost and at ready to use concentration levels. As noted above, the transesterification reaction was permitted to proceed in the extruder for about 3–5 minutes at a temperature of about 260–300° C. Under these conditions, the functionally-terminated polyolefin oligomer forms a copolymer with the polyamide via transesterification. For understanding purposes, transesterification may be thought of as a reaction whereby the functionally-terminated polyolefin oligomer species are substituted for some of the former polyamide monomeric species originally present in the starting polyamide. Regardless of the mechanism, copolymer is formed for singly and multiply functionally terminated polyolefin oligomer species.

When prepared via a reactive extrusion process in which pellets are formed and then stored, it is most desirable to control the amount of moisture uptake of the copolymer in order to minimize the need for drying prior to fabrication into packaging articles. Control of moisture uptake can be accomplished by a two step process. First the copolymer extrudate can be cooled using a non-aqueous submersion quench process prior to chipping into pellets as disclosed in U.S. Pat. No. 5,536,793. This process allows for the preparation of low moisture pellets. Next the pellets are sealed directly in moisture proof containers (e.g., cans) for storage.

The pellets may be used from storage directly in subsequent melt processing steps commonly employed in the packaging industry such as extrusion blow molding, film casting, sheet extrusion, injection molding, melt coating. If drying is required, it is desirable to dry the pellets in a vacuum oven or in a desiccant oven which is blanketed with nitrogen.

In order to minimize loss of oxygen scavenger utility of the copolymer, the copolymer can be produced during the melt fabrication step used to make the packaging article. This is dependent on the flexibility of the fabrication process and is typically preferred for extrusion type processes such as form or sheet extrusion. As will be explained later, the copolymers are relatively safe from blatant oxygen attack once they are incorporated into a bottle or film.

Additives which may also be present in the copolycondensates of this invention include heat stabilizers, antioxidants, colorants, crystallization nucleating agents, blowing agents (when foam is needed), fillers, biodegradation accelerants, branching agents, chain extending agents. As will be appreciated by those of ordinary skill in the art, inclusion of such additives yields copolymers which are within the spirit of this invention. The copolymers of this invention are also suited for use in opaque applications such as rigid opaque crystalline copolycondensate trays which would contain low levels of crystallization nucleating agents such as polyolefins. Also, the copolymers of this invention could be used to make cellular structures where the copolymers would be foamed to a lower density serving to further reduce the cost of the container. For some applications, blends of the copolycondensates of this invention would be useful. Typically the blending of the copolymers of this invention would be with other polycondensates, especially polyamides. However, even immiscible blends could be appropriate for certain applications.

While applicants prefer to fabricate the copolymers of this invention using polycondensation methods, those skilled in the art will recognize that the copolymers could be formed, under certain circumstances, by an addition polymerization process or by a combination of polycondensation and addition polymerization. Previously it was noted that R1 in Formula I and/or R2 in Formula II may contain at least one olefinic unsaturation site. The availability of olefinic unsaturation sites in the polyamide backbone creates a condition whereby polyolefin oligomer segments could be incorporated into the polyamide by an addition polymerization process. Alternatively, the availability of olefinic unsaturation sites in the polyamide backbone creates a condition whereby unsaturated moieties capable of entering into polycondensation could be attached to the polymer backbone by an addition type reaction. Maleic anhydride and acrylic acid are both olefinically unsaturated and are good examples of such moieties which may be attached to the polyamide backbone at unsaturated sites by addition and create polycondensation sites at the other end of the molecules. These recently added polycondensation sites could then undergo a condensation reaction with species as depicted in Formulas IV, V, and VI thus adding polyolefin oligomer segments to the polyamide. Even when R1 and R2 from Formulas I and II are both saturated, another possible route to adding polyolefin oligomer segments is still available. The saturated polyamide chain could be reacted with an agent, such as maleic anhydride, capable of reacting with the polyamide, for example at the polycondensation sites available at the ends of the polyamide macromolecules. Such treatment of polymers is well known in the art and often referred to as "maleation". Once attached by condensation to the polyamide (either along the backbone or at the ends of the polyamide molecules), the attached maleic anhydride creates olefinically unsaturated sites which are subject to incorporation of olefin oligomers by an addition reaction. Copolyamides having polyolefin oligomer segments which are fabricated by any of these miscellaneous methods are well envisioned by applicants and considered to be within the scope of this invention.

The packaging polyamides of this disclosure are well known in the art. Generally they are prepared by polycondensation of one or several diacid species with one or several diamine species under polycondensation conditions and in the presence of a suitable polycondensation catalyst. Such polycondensations to form polyamides are also well studied and well known in the art and form no part, per se, of the current invention. While most polyamides are amenable to the benefit to be realized from this invention, certain polyamides are more commonly used in the packaging industry and therefore are the preferred polyamides of this invention. These preferred polyamides include those having diacid moieties such as adipic acid, phthalic acid, isophthalic acid, terephthalic acid, naphthalene dicarboxylic acid, substituted derivatives of the preceding and mixtures of the preceding. The diamine moieties of the preferred polyamides include polymethylene diamines including hexamethylene diamine, the xylene diamines, mononuclear aromatic diamines such as the benzene diamines, polynuclear aromatic diamines such as the naphthalene diamines, substituted derivatives of the preceding and mixtures of the preceding. Those skilled in the art will recognize that various derivatives of the above mentioned diacids and diamines may be used which will still result in formation of the same polyamides under polycondensation conditions. Generally, the polyamide segments of the copolyamides of this invention will be comprised of segments of the polyamides which result from condensation of the above listed diacids and diamines.

Figure 1:
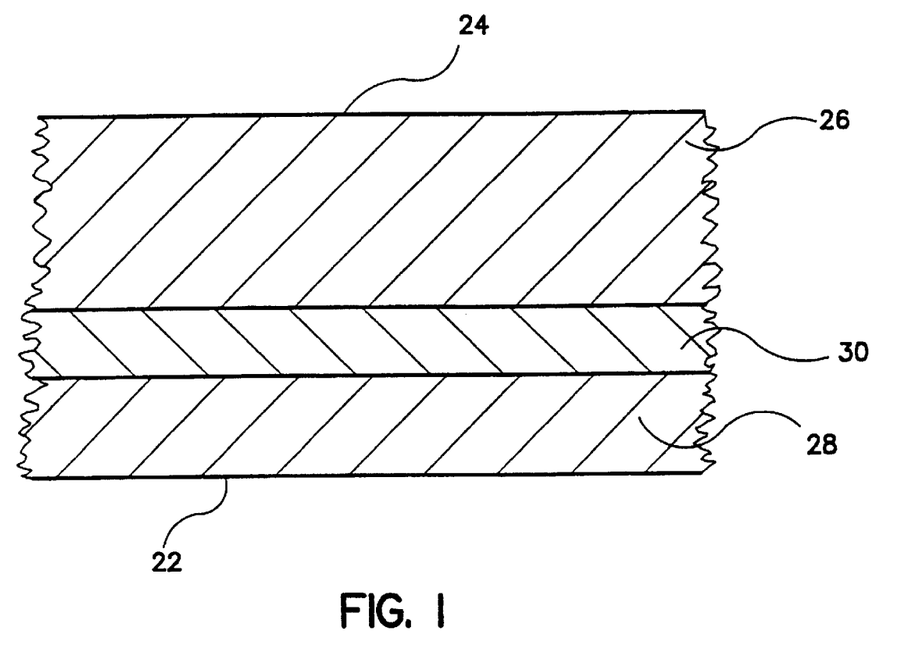
FIG. 1 is a cross sectional view of the preferred oxygen scavenging bottle wall and film construction.

When prepared by transesterification/transamidation in a reactive extruder as described above, the copolycondensates of this invention are typically first pelletized and then processed into packages, bottles or films. The preferred type of package wall, bottle wall or film construction comprises a three layered embodiment as shown in FIG. 1. The outside of the bottle or package wall 24 is formed by a thicker layer 26 of unmodified packaging polyamide and may be comprised of recycled polyamide since it does not contact the package cavity or the packaged material. The inside of the bottle or package wall 22 which defines the package cavity is formed by a thinner layer 28 of unmodified packaging polyamide. The middle layer 30 is comprised of the copolyamides of this invention. While the embodiment of FIG. 1 may require special extrusion equipment, it is still preferred for the following reasons: (1) it creates a structure with a relatively thick layer of exposed polyamide which serves as a good passive barrier to oxygen from air, (2) the inner layer in contact with the packaged material is also polyamide which has a long history of usage and acceptance for packaging of consumable materials, (3) placing the copolyamides of this invention between two layers of unmodified polyamide with good passive barrier properties isolates the oxygen scavenging copolymers from direct contact with air or oxygen and preserves their oxygen scavenging ability to be applied only to oxygen which passes through the unmodified polyamide layers, and (4) the copolyamide and the unmodified polyamides are of such similarity that they bond together when co-extruded without the need for or use of a tie layer of adhesive.

The preferred three layer embodiment described above is most easily achieved by co-extrusion of one layer of copolymer with the two layers of unmodified polyamide The copolymer is so chemically similar to the unmodified polyamide that the three layers uniformly adhere to each other and form a monolithic structure upon cooling. No tie layer adhesives are required. However, in the articles of manufacture of this invention where recycling is not important, additional non-polyamide layers can be incorporated to improve adhesion, improve barrier properties, reduce costs. It may be possible to achieve the preferred three layered embodiment by techniques other than co-extrusion such as by coating with solutions or heat fusion of separate layers. Any method other than co-extrusion may have disadvantages of (1) reduction of scavenging potential by unwanted and/or inadvertent exposure of the oxygen scavenging copolymers to air or oxygen; and (2) additional processing steps. For fabrication of bottles, joining the three layers by adhesives would work against the objective of recyclability unless the adhesive was polyamide based or polyamide compatible. For production of films and wraps, recyclability is not nearly as important a consideration yet as it is for bottles. In fact, for films, it may even be desirable to use layers of the copolymers of this disclosure in conjunction with layers of other materials such as polyethylenevinyl alcohol layers and polyolefin layers. While immediate co-extrusion of these copolymers may be the most preferred use for them, other use options are also available. For example, the copolymers could be blended as a concentrate with other polyamides for film or bottle manufacture, or be used as an inner liner or layer in a multi-layer construction sense, for example, in packaging electronic components.

In a broad embodiment, then this invention discloses a laminar composition comprising at least one layer of a packaging material and at least one layer of an active oxygen scavenging copolyamide of this invention wherein said copolyamide comprises predominantly polyamide segments and an active oxygen scavenging amount of polyolefin oligomer segments. Predominantly, as used above, means that the copolyamide is at least 50 wt % polyamide segments. Typically, the polyolefin oligomer segments comprise about 0.5 to about 12 wt % of the copolyamide, preferably about 2.0 to about 8.0 wt % and most preferably about 2.0 to about 6.0 wt % of the copolyamide. The layer of packaging material is typically a thermoplastic packaging material. A list of preferred thermoplastic materials may be found in USA 21 CFR § 177.1010–177.2910, revised as of Apr. 1, 1997. However, the copolyamides of this invention may be used as active oxygen scavengers to consume head space oxygen in the form of an inner coating on cans or glass jars/bottles. In these applications, the layer of packaging material would comprise metal or glass. A preferred layer of packaging material comprises polyamide and especially preferred are polyamides from which the polyamide segments in the copolyamide were derived. Another preferred layer of packaging material comprises polyesters, especially the bottling polyesters such as those listed in USA 21 CFR § 177.1590, revised as of Apr. 1, 1997. The use of the copolyamides of this invention in a laminar construction further comprising a polyester layer is especially attractive when passive gas barrier properties beyond those available, e.g., from PET, are needed. In particular, beer bottles must be able not only to keep oxygen out and remove head space oxygen, but they must also serve to keep carbon dioxide from escaping from the bottled beer. A polyamide based scavenging layer would provides a superior passive barrier to reduce escape of carbon dioxide from beer over a polyester based scavenger layer.

When desired for certain applications, methods are available to make the oxygen scavenging properties of these copolymers even more effective. For example an oxidation catalyst could be optionally added to the copolymer during the product fabrication stage. This is a separate addition of catalyst to aid in the uptake of oxygen and is in addition to residual oxidation catalyst, if any, remaining from formation of the copolymer. The presence of such a catalyst when added and employed in the range of 10 to 2,000 PPM with respect to the weight of the copolymer serves to facilitate the rate of oxygen uptake, often dramatically. The preferred catalysts are the multivalent transition metals such as iron and manganese. Cobalt is especially preferred.

The copolymers of this invention may be used in conjunction with other oxygen consuming systems. For example one embodiment for enhanced oxygen scavenging for fabricated products of this invention involves the optional inclusion of photo-activators (such as small amounts of benzophenone) in the fabricated products along with the copolymers of this disclosure. Fabricated products, such as bottles, containing the optional photo-active materials as well as the copolymers of this disclosure would be exposed to UV light sufficient to activate the photo-active materials toward oxygen uptake prior to use (i.e., bottle filling) or shipment of the fabricated product.

In yet a different enhanced embodiment, additional oxygen scavenging materials are deployed within the package cavity along with the use of the copolymers of this disclosure which would comprise the packaging material. Normally, these additional oxygen scavengers would take the form of a sachet, especially for non-consumable oxygen sensitive materials such as electronic components. For consumable oxygen sensitive substances, the additional oxygen scavenging materials might take the form of a mat as is often used in butcher shops under a cut of meat or poultry. Additional oxygen scavenger may also be deployed in the form of a bottle cap layer. In many embodiments of this technique, the additional oxygen scavenger employed is one which is an entirely different system than the copolyamides of this invention.

In yet another enhanced embodiment, the copolymers of this disclosure are deployed as an internal coating for a glass or metal container/can either alone or along with known glass/metal container coating polymers. In either situation, both passive and active oxygen barriers are present since the glass/metal container itself is a passive oxygen barrier. In either case, the copolymers of this disclosure are prepared so as to comprise a thermoset resin, or resin blend, which could be spray coated onto the interior container walls. A sprayable resin could most easily be made by blending a small amount of a copolymer of this invention with a thermoset resin normally used for coating cans. It may be necessary to prepare the copolymer with a higher percentage of polyolefin oligomer segments than 12 wt % so as to require only a minimal amount of the copolymer blended with the sprayable resin. The benefit of a glass/metal container liner comprising an active oxygen scavenger is that it affords the opportunity to dissipate head space oxygen. The use of a can lining to remove head space oxygen from a can of edible product is much more appetizing than use of a sachet or other article which must be separated from the product and discarded by the consumer.

As has been indicated in several instances already, recycle of bottles fabricated using the copolymers of this disclosure is an important inventive aspect of this disclosure. Further, the fabricated bottles should be suitable for recycle with other polyamide bottles without the need for any special processing such as delamination or depolymerization. A quick review of the materials present in the fabricated bottles of this invention shows how the recycle requirements have been met. FIG. 1 shows a cross section of the preferred bottle wall construction. In FIG. 1, layers 26 and 28 are preferably comprised of unmodified packaging polyamide. Exterior surface 24 is defined by the thicker layer of polyamide (which may already be recycled polyamide) and interior surface 22 (i.e., package or bottle cavity) is defined by the thinner layer 28 of typically virgin polyamide. Middle layer 30 is comprised of the oxygen scavenging copolymers of this invention. For a typical bottle of approximately one half liter capacity, the oxygen scavenging copolymer layer of the bottle represents about 5% by weight of the entire bottle. The remaining 95% of the bottle is unmodified polyamide. Under the heavier loading conditions of the copolymer with about 12% polyolefin oligomer, the copolymer layer is still 88% by weight polyamide/polyamide segments and is typically 96% by weight polyamide when the more preferred percentages of polyolefin oligomer segments are employed. This means the final fabricated bottle is at least 99.4 weight percent polyamide and typically 99.8 weight percent polyamide. It is this high weight percentage of polyamide in the fabricated bottle which renders it suitable for recycle with other polyamide bottles.

Primary application for the oxygen scavenging copolymers of this disclosure will be for fabrication into packaging walls and packaging articles previously recited in several instances in this disclosure. A major use for these fabricated articles comprises the packaging of perishable foods and perishable items. A non-limiting list of perishable foods particularly amenable to the packaging described in this disclosure would include dairy products such as milk, yogurt, ice cream and cheeses, prepared foods such as stews and soups, meat products such as hot dogs, cold cuts, chicken and beef jerky, single serve items such as pre-cooked meals and pre-cooked side dishes, ethnic offerings such as pasta and spaghetti sauce, condiments such as barbecue sauce, ketchup, mustard and mayonnaise, beverages such as fruit juice, dry foods such as dried fruits, dried vegetables and breakfast cereals, baked goods such as bread, crackers, pastries, cookies and muffins, snack foods such as candy, potato chips and cheese-filled snacks, spreads such as peanut butter, peanut butter and jelly combinations, jams and jellies, and seasonings either dried or fresh. Generally, the disclosed copolymers and packaging made therefrom can be used to enhance the barrier properties in packaging materials intended for any type of product, whether it be food, beverages or otherwise, which degrades in the presence of oxygen. In essence, packages made comprising the active copolyamides of this invention serve to lengthen the shelf life of oxygen sensitive products. The copolyamides of this invention are also amenable to use for packaging of a wide variety of non-food items since they have the capacity to scavenge oxygen in either the presence or absence of water or moisture.

SERIES NO. 1 EXAMPLES

COPOLYAMIDE PREPARATION AND PROPERTIES

The copolymers referenced in Tables 1 and 2, unless otherwise indicated, were prepared in the manner as herein described. The preparations were made in a Werner and Pfleiderer ZSK-30 co-rotating twin screw extruder with fully intermeshing screws having a 45:1 length to screw diameter. The ZSK-30 extruder was also equipped with a KTRON loss-in-weight pellet feeder. The amorphous polyamides used were either AMODEL® 2010 or ZYTEL® 330 resin pellets which were first dried overnight at 125° C. in a desiccant oven. AMODEL® 2010 is a polyphthalamide comprising about 40 mole % terephthalic and about 60 mole % isophthalic diacid derivative moieties and 100 mole % hexamethylene diamine (HMDA) as the diamine moiety. ZYTEL® 330 is a polyphthalamide comprising about 30 mole % terephthalic and about 70 mole % isophthalic diacid derivative moieties and 100 mole % (HMDA) as the diamine moiety.

The dried polyamide pellets were introduced to the feed section of the extruder via the loss-in-weight pellet feeder under a blanket of nitrogen gas. The hydroxy terminated polybutadiene (PBD) oligomer was maintained in a viscous fluid vessel under nitrogen gas pressure from which it was separately conveyed via a positive displacement pump to the polyamide melt through an injection port on the extruder.

copolymers. Transmission Electron Micrographs of osmium tetroxide stained thin sections of product pellets were also obtained which showed POO diameter segments clustered in a size range under about 15 NM. The results are consistent with formation of reacted copolyesterpolyamide entities in the extruder because (1) the IV's (inherent viscosities) for extruded resins were higher than starting materials, (2) because of slightly depressed copolymer $T_{(g)}$'s (glass transitions temperatures), and also (3) because of POO diameter segment sizing.

In Table 1, Resin 117-2B was prepared using a 50–50 wt % blend of 117-1A and 117-2. $T_{(g)}$ was determined by differential scanning calorimetry. IV was determined by the method of ASTM D2857 in phenol-TCE solvent and at 25° C. and is given in units of dl/g. $M_n$ and $M_w$ were determined by gel permeation chromatography (ASTM D3593 and ASTM D4001) using Shodex A-80MS columns and hexafluoroisopropanol with sodium triacitate buffer as solvent. Izod impact strength was determined by the method of ASTM D-256 and is given in units of kg-m/cm (ft-lb./inch) of notch.

TABLE 1

| RESIN & RUN ID⇒<br>PROPERTY⇓ | AMODEL®<br>NEAT<br>ID # 117-1A | AMODEL®<br>4 WT % PBD<br>ID # 117-2 | AMOOEL®<br>2 WT % PBD<br>ID # 117-2B | ZYTEL®<br>NEAT<br>ID # 119-1 | ZYTEL®<br>4 WT % PBD<br>ID # 119-2 |
|---|---|---|---|---|---|
| glass transaction temperate ($T_{(g)}$), ° C. | 107.7 | 121.2 | | 118 | 122 |
| intrinsic viscosity (IV) | 0.85 | 1.04 | | 0.72 | 0.78 |
| molecular wt, ($M_n$) ($\times 10^{-3}$) | 17.8 | 20.9 | | 15.9 | 17.3 |
| molecular wt, ($M_w$) ($\times 10^{-3}$) | 59.3 | 91.1 | | 42.2 | 50.8 |
| $M_n/M_w$ | 3.33 | 4.36 | | 2.66 | 2.94 |
| Izod impact strength, | 0.116<br>(2.14) | | 0.115<br>(2.11) | 0.073<br>(1.35) | 0.097<br>(1.79) |

The oligomer used was a PBD diol of about 1230 molecular weight (R20LM available from Elf Attochem). The polyamide feed rate was set at 6.7 kg/hr (14.8 lb./hr) while the PBD was delivered at a rate of about 28 g/hr (0.062 lb./hr) in order to obtain a copolyamide having about 96 wt % polyamide segments and about 4 wt % PBD segments. The extrusion residence time was in the range of about 3–4 minutes and the temperature profile for the reactive extrusion was maintained in the range of 280–300° C. Volatiles generated from the reaction were removed via vacuum pump. The copolymer extrudate was thermally quenched on a Sandvik metal belt and pelletized. The finished pellets were packaged in moisture and gas resistant aluminum foil bags. To keep the copolymer free from oxygen contamination, the entire extrusion line process was blanketed with nitrogen gas including pre-flushing of the storage bags. It is to be noted that the copolyamides for this run were prepared in the absence of a transesterification catalyst. Optionally a transition metal transesterification catalyst may also be employed in the extruder mixture in the range of about 50–300 PPM with respect to the weight of the extruder mixture.

The reactive extrusion resins prepared as indicated above were evaluated for oxygen absorption, thermal properties, inherent viscosities, molecular weight distributions, mechanical properties, and dynamic mechanical properties. Some of the resulting data are summarized in Table 1. Some of the pellets were treated with osmium tetroxide which stains only the polyolefin oligomer (POO) segments in the

COPOLYAMIDE OXYGEN SCAVENGING—
SERIES 1

Figure 2:
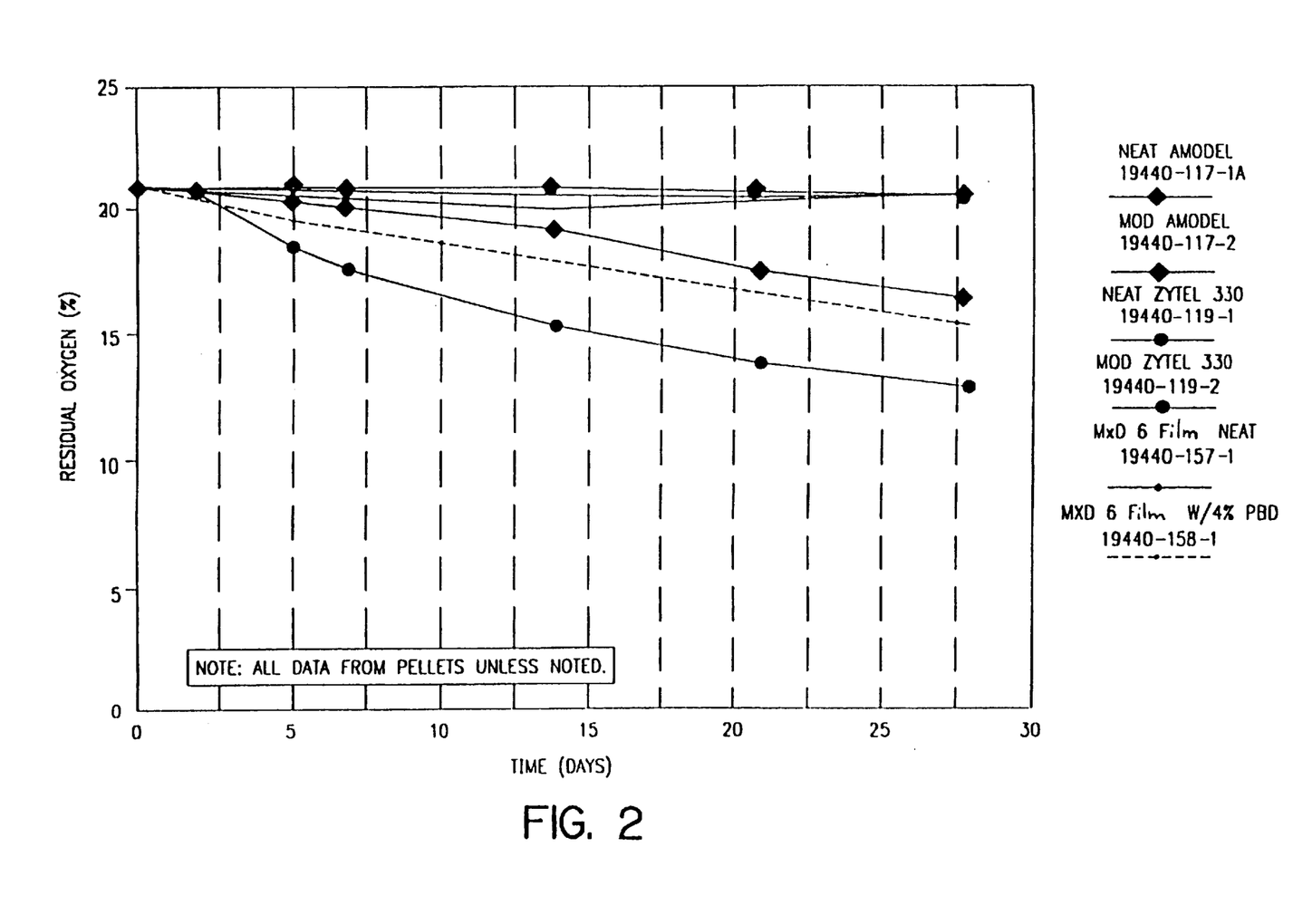
FIG. 2 is a graph which shows the oxygen scavenging propensity of a set of resins of this invention versus various control resins.

The resins of the Series 1 preparations were evaluated for oxygen uptake by placing 25 g of pellets into 500 ml Ball jars equipped with sampling septa. The samples were stored at 60° C. in an oven, and the oxygen content of the jars was monitored on a Mocon HS750 oxygen analyzer by withdrawal of 2 cc of gaseous aliquots at periodic intervals. The data obtained are shown in Table 2 and depicted graphically in FIG. 2. The resin ID numbers in FIG. 2 and also in Table 3 are preceded by the character sequence "I 9440" which was an internal control number for the project and should be ignored in interpreting the results. It is easily discerned from these data that the copolyamides of this invention have substantial oxygen scavenging capacity. Thus a major objective of this invention has been achieved in that active oxygen scavenging capacity has been added to a polyamide based material, which inherently already has superior passive oxygen barrier properties as compared to similar polyester constructions.

The numerical values in Rows 2–7 and Columns 2–6 of Table 2 list the percent oxygen remaining in the air sample trapped in the 500 ml Ball jars along with the 25 g resin sample. Resin ID #120-1 is an oxygen scavenging resin disclosed in U.S. patent application Ser. No. 08/717,370 and is included for comparison purposes along with control samples of unmodified Amodel®

TABLE 2

| RESIN & RUN ID⇒<br>DAY NUMBER⇩ | AMODEL ®<br>NEAT<br>ID # 117-1A | AMODEL ®<br>4 WT % PBD<br>ID # 117-2 | ZYTEL ®<br>NEAT<br>ID # 119-1 | ZYTEL ®<br>4 WT % PBD<br>ID # 119-2 | PET<br>4 WT % PBD<br>ID # 120-1 |
|---|---|---|---|---|---|
| 0 | 20.9 | 20.9 | 20.9 | 20.9 | 20.9 |
| 2 | 20.9 | 20.6 | 20.8 | 20.5 | 19.3 |
| 5 | 20.8 | 20.3 | 20.7 | 18.5 | 16.7 |
| 7 | 20.8 | 20.1 | 20.6 | 17.5 | 15.5 |
| 14 | 20.7 | 19.1 | 20.5 | 15.2 | 12.7 |
| 21 | 20.5 | 17.4 | 20.3 | 13.6 | 10.9 |
| 28 | 20.5 | 16.3 | 20.3 | 12.5 | 9.8 | and Zytel®. It should be emphasized that the tests run in Table 2 were made in the absence of cobalt or other transition metal(s) as promoter/catalyst for the reaction with and uptake of oxygen by the copolymer. In practice, the copolyamides of this invention are typically deployed in the presence of about 10–2,000 PPM (with respect to the weight of the copolymer) of transition metal catalyst. The transition metal catalyst is typically added to the copolymer during fabrication of the packaging article. Cobalt is the preferred catalyst, especially preferred is cobalt added in the form of cobalt carboxylate, and very especially preferred is cobalt octoate.

SERIES NO. 2 EXAMPLES

COPOLYAMIDE PREPARATION AND PROPERTIES

A second series of copolymer preparations were made using MXD-6 as the polyamide in the extruder and therefore as the source of polyamide segments in the copolyamide. MXD-6 is poly(m-xyleneadipamide) and has been previously described in this application. The preparation for Series 2 was the same as for Series 1 through the extrusion except that MXD6 was used instead of Amodel® or Zytel®. The MXD6 copolymer of Series 2 was extruded through a 15.2 cm slot die manufactured by Extrusion Dies, Inc. (EDI) (an EDI 6 inch slot die) onto a two roll cooling stack and then recovered as film on a constant tension winder. After recovery, samples were placed in heat sealable foil bags. The bags were purged with nitrogen gas and sealed. Polymer feed rates, screw speed, extruder temperatures, degree of vacuum, and residence times were adjusted to provide for stable extrusion of the MXD-6 copolyamide film. Table 3 shows the extruder process data values used for both Series 1 and Series 2 resins. Neat MXD-6 film was designated with ID # 157-1 and copolymer MXD-6 with 4 wt % PBD was designated with ID # 158-1. In Table 3, all pressures listed in Columns 10–13 are as indicated by the pressure gauge employed.

COPOLYAMIDE OXYGEN SCAVENGING— SERIES 2

The resins of the Series 2 preparations were evaluated for oxygen uptake by placing only 10 g of film (instead of 25 g of pellets as in Series 1) into 500 ml Ball jars equipped with sampling septa. The samples were stored at 60° C. in an oven, and the oxygen content of the jars was monitored on a Mocon HS750 oxygen analyzer by withdrawal of 2 cc of gaseous aliquots at periodic intervals. The data obtained are also depicted graphically in FIG. 2 along with the data of the Series 1 resins. From FIG. 2 it can be seen that 10 g of copolyamide in film form is nearly as effective as 25 g of copolyamide in pellet form for oxygen uptake. There are several competing factors which make direct comparisons difficult. The film samples. allow greater access of the oxygen present to the scavenger as compared to the pellet samples. Also, polyamides are better passive oxygen barriers than polyamides making it more difficult for the oxygen to reach the scavenging moiety in a copolyamide than in a copolyester. In practice, the copolyamide films are also typically deployed in the presence of about 10–2,000 PPM (with respect to the weight of the copolymer) of transition metal catalyst. The transition metal catalyst is typically added to the copolymer during fabrication of the packaging article. As above, cobalt is the preferred catalyst, especially preferred is cobalt added in the form of cobalt carboxylate, and very especially preferred is cobalt octoate.

TABLE 3

EXTRUDER PROCESS DATA

| Sample | Screw Speed | Torque Min. | Torque Max. | Polymer Rate | Additive Rate | Additive Percent (w/w) | Form of Product | Vacuum | Extruder Outlet Pressure Min. | Extruder Outlet Pressure Max. | Pressure at Die Min. | Pressure at Die Max. | Residence time First Color | Peak | Residence time Last Color |
|---|---|---|---|---|---|---|---|---|---|---|---|---|---|---|---|
| 19440-117-1A | | | | | | NA | Pellet | | | | | | | | |
| 19440-117-2 | 69 Rpm | 38% | 40% | 6.71 Kg/hr (14.8 Lb/Hr) | 272 g/hr (0.6 Lb/Hr) | 40% | Pellet | 74.9 cm Hg (29 5 in hg) | 10.3 bars (150 Psig) | 22.1 bars (320 Psig) | 10.3 bars (150 Psig) | 22.1 bars (320 Psig) | 140 Sec | 195 Sec | 285 Sec |
| 19440-119-1 | | | | | | NA | Pellet | | | | | | | | |
| 19440-119-2 | 69 Rpm | | 43% | 6.71 Kg/hr (14.8 Lb/Hr) | 272 g/hr (0.6 Lb/Hr) | 39% | Pellet | 74.9 cm Hg (29 5 in hg) | | | | | | | |

TABLE 3-continued

| | | | | | EXTRUDER PROCESS DATA | | | | | |
|---|---|---|---|---|---|---|---|---|---|---|
| 19440-153-2 | 123 Rpm | 53% | 6.89 Kg/hr (15.2 Lb/Hr) | 272 g/hr (0.6 Lb/Hr) | 40% | Film | 71.1 cm Hg (28.0 in hg) | 37.9 bars (550 Psig) | 50.0 bars (710 Psig) | |
| 19440-154-1 | 61 Rpm | 63% | 6.89 Kg/hr (15.2 Lb/Hr) | | NA | Film | 0.0 cm Hg (0.0 in hg) | 58.6 bars (850 Psig) | 22.8 bars (330 Psig) | |

| | Extruder Temperatures | | | | | | | | | | | | | | | Melt Temperature | |
|---|---|---|---|---|---|---|---|---|---|---|---|---|---|---|---|---|---|
| Sample | Zone 1 | Zone 2 | Zone 3 | Zone 4 | Zone 5 | Zone 6 | Zone 7 | Zone 8 | Zone 9 | Zone 10 | Zone 11 | Zone 12 | Zone 13 | Zone 14 | Gear Pump | Die | Min. / Max. |
| 19440-117-1A | | | | | | | | | | | | | | | na | | |
| 19440-117-2 | 280 °C. | 295 °C. | 295 °C. | 285 °C. | 285 °C. | 285 °C. | 285 °C. | 285 °C. | 285 °C. | | | | | | na | 300 °C. | |
| 19440-119-1 | | | | | | | | | | | | | | | na | | |
| 19440-119-2 | 270 °C. | 280 °C. | 280 °C. | 280 °C. | 280 °C. | 280 °C. | 275 °C. | 275 °C. | 265 °C. | | | | | | na | 255 °C. | 262 °C. / 269 °C. |
| 19440-153-2 | 120 °C. | 150 °C. | 175 °C. | 200 °C. | 230 °C. | 230 °C. | 175 °C. | 175 °C. | 175 °C. | 175 °C. | 175 °C. | 200 °C. | 200 °C. | 200 °C. | 200 °C. | 200 °C. | |
| 19440-154-1 | 110 °C. | 150 °C. | 215 °C. | 217 °C. | 217 °C. | 217 °C. | 220 °C. | 223 °C. | 223 °C. | 223 °C. | 223 °C. | 223 °C. | 223 °C. | 223 °C. | 220 °C. | 220 °C. | |

As can be seen from the examples data, the copolyamides of this invention have substantial active oxygen scavenging capacity which serves to enhance their already superior passive oxygen barrier properties as compared to polyester. The copolymers disclosed herein are most advantageously deployed as a layer in a multi-layer packaging construction, particularly when an additional passive oxygen barrier layer is present to shield the active oxygen scavenging copolymers of this invention from blatant oxygen attack (from oxygen in air) and also when an additional adjacent layer is chemically similar to the copolyamides. Those skilled in the art, however, will appreciate that variations on this basic form of deployment are possible and should be considered to be within the scope of this invention.

We claim:

1. An oxygen barrier laminar composition comprising a layer of packaging material selected from the group consisting of polyester, polyamide, polyethylenevinyl alcohol, polyolefin, metal, glass, and thermoplastic materials as listed in USA 21 CFR § 177.1010–177.2910, and a layer of active oxygen scavenging copolyamide comprising predominantly polyamide segments and an active oxygen scavenging amount of polyolefin oligomer segments; and wherein said copolyamide exists as a solid below its glass transition temperature and the copolyamide is capable of scavenging oxygen in its solid state at temperatures in the range of 0° C. to 60° C.

2. The laminar composition of claim 1 wherein the packaging material is a polyamide and wherein the polyamide segments in the copolyamide are derived from the polyamide packaging material.

3. The laminar composition of claim 1 wherein the polyolefin oligomer segments comprise from 0.5 to 12 wt % of the copolymer.

4. The laminar composition of claim 1 wherein the polyolefin oligomer is selected from the group consisting of polypropylene, poly(4-methyl)1-pentene, polybutadiene and mixtures thereof.

5. The laminar composition of claim 1 wherein the polyolefin oligomer has a molecular weight in the range of 1000–3000.

6. A packaging article comprising a package wall comprising the laminar composition of claim 1 disposed within the package wall.

7. A method of extending the useful shelf life of an oxygen sensitive substance which comprises packaging said oxygen sensitive substance in a suitable packaging article comprising a package wall comprising the laminar composition of claim 1 disposed within the package wall.

8. An oxygen scavenging composition comprising (A) a copolyamide comprising predominantly polyamide segments and an active oxygen scavenging amount of polyolefin oligomer segments and (B) a transition metal catalyst present in the range of 10–2000 PPM with respect to the weight of the copolyamide; and wherein the copolyamide is capable of scavenging oxygen in the solid state at ambient temperatures.

9. The oxygen scavenging composition of claim 8 wherein the transition metal catalyst is cobalt.

10. The oxygen scavenging composition of claim 9 wherein the source of cobalt is cobalt octoate.

11. The oxygen scavenging composition of claim 8 further comprising photo-active materials which, after sufficient activation by radiation, serve to enhance the oxygen scavenging of the copolyamides.

* * * * *

UNITED STATES PATENT AND TRADEMARK OFFICE
CERTIFICATE OF CORRECTION

PATENT NO.    : 6,506,463 B1
DATED         : January 14, 2003
INVENTOR(S)   : Paul J. Cahill, Joel Albert Richardson and Raymond V. Wass It is certified that error appears in the above-identified patent and that said Letters Patent is hereby corrected as shown below:

Column 8,
Lines 15-19, insert formulas V and VI:

$$\text{IV.} \quad H\text{-}O\text{-}\underset{\underset{O}{\|}}{C}\text{-}(POO)\text{-}\underset{\underset{O}{\|}}{C}\text{-}O\text{-}H$$

V.   H-O-(POO)-O-H

VI.  $H_2N$-(POO)-$NH_2$

Column 11,
Line 18, should read -- temperature range of about 260 - 300° C. --, instead of "temperature range of about 260 - 3000° C."

Columns 17-18,
Table 1, 4th column, 1st line, should read -- AMODEL® -- instead of "AMOOEL®"
Table 1, 1st column, 4th line, should read -- glass transition -- instead of "glass transaction"

Column 18,
Line 51, should read -- preceded by the character sequence "19440" which -- instead of "preceded by the character sequence "I 9440" which"

Column 20,
Line 36, should read -- The film samples allow greater access -- instead of "The film samples. allow greater access"

Column 21,
Line 45, should read -- polyester, unmodified polyamide -- instead of "polyester, polyamide"
Lines 46-47, should read -- polyolefin, metal, and glass, and a layer of active oxygen scavenging -- instead of "polyolefin, metal, glass, and thermoplastic materials as listed in USA 21 CFR § 177.1010-177.2910, and a layer of oxygen scavenging"
Line 56, should read -- packaging material is unmodified polyamide -- instead of "packaging material is a polyamide"

UNITED STATES PATENT AND TRADEMARK OFFICE
CERTIFICATE OF CORRECTION

PATENT NO.   : 6,506,463 B1
DATED        : January 14, 2003
INVENTOR(S)  : Paul J. Cahill, Joel Albert Richardson and Raymond V. Wass It is certified that error appears in the above-identified patent and that said Letters Patent is hereby corrected as shown below:

Column 22,
Line 58, should read -- unmodified polyamide packaging -- instead of "polyamide packaging"

Signed and Sealed this

Second Day of March, 2004

JON W. DUDAS
*Acting Director of the United States Patent and Trademark Office*